(12) United States Patent
Chin

(10) Patent No.: US 6,718,137 B1
(45) Date of Patent: Apr. 6, 2004

(54) METHOD AND APPARATUS FOR CONFIGURATION BY A FIRST NETWORK ELEMENT BASED ON OPERATING PARAMETERS OF A SECOND NETWORK ELEMENT

(75) Inventor: Hon Wah Chin, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/225,920

(22) Filed: Jan. 5, 1999

(51) Int. Cl.[7] .................... H04B 10/00; G06F 15/173
(52) U.S. Cl. ............................... 398/3; 709/223
(58) Field of Search ................. 359/135, 137, 359/138, 110, 118, 119; 398/3, 75, 78, 99, 100; 709/202, 223

(56) References Cited

U.S. PATENT DOCUMENTS

| | | | | |
|---|---|---|---|---|
| 5,758,083 A | * | 5/1998 | Singh et al. ................ | 709/223 |
| 5,761,428 A | * | 6/1998 | Sidey .......................... | 709/223 |
| 5,914,798 A | * | 6/1999 | Liu .............................. | 359/161 |
| 5,923,851 A | * | 7/1999 | Gallagher et al. .......... | 709/228 |
| 5,968,176 A | * | 10/1999 | Nessett et al. .............. | 713/201 |
| 5,996,010 A | * | 11/1999 | Leong et al. ................ | 709/223 |
| 6,046,833 A | * | 4/2000 | Sharma et al. .............. | 359/119 |
| 6,075,630 A | * | 6/2000 | Nishio ......................... | 359/110 |
| 6,094,672 A | * | 7/2000 | Willie et al. ................ | 709/202 |
| 6,101,182 A | * | 8/2000 | Sistanizadeh et al. ........ | 370/352 |
| 6,108,782 A | * | 8/2000 | Fletcher et al. ............. | 370/245 |
| 6,122,082 A | * | 9/2000 | Fishman ...................... | 359/117 |
| 6,225,999 B1 | * | 5/2001 | Jain et al. ................... | 345/734 |
| 6,269,330 B1 | * | 7/2001 | Cidon et al. ................. | 704/43 |
| 6,275,853 B1 | * | 8/2001 | Beser et al. ................. | 709/223 |
| 6,282,568 B1 | * | 8/2001 | Sondur et al. ............... | 709/223 |
| 6,363,421 B2 | * | 3/2002 | Barker et al. ................ | 709/223 |
| 6,377,374 B1 | * | 4/2002 | Davis et al. ................. | 359/128 |
| 6,389,464 B1 | * | 5/2002 | Krishnamurthy et al. ... | 709/220 |

* cited by examiner

*Primary Examiner*—Leslie Pascal
*Assistant Examiner*—Dalzid Singh
(74) *Attorney, Agent, or Firm*—Michael R. Cammarata; Steve LeBlanc; Jason Rhodes

(57) ABSTRACT

A first network element includes or is associated with a query engine that allows it to retrieve operating parameters from a second network element even when the first and second network elements are not participating in a common routing protocol. The first element is thereby able to infer the quality of data signals passing through it and take configuration action in response to an operational problems. In one embodiment, a preexisting management agent in the second element is utilized by the first element and modification or enhancement of the second element is not necessary.

15 Claims, 3 Drawing Sheets

METHOD AND APPARATUS FOR CONFIGURATION BY A FIRST NETWORK ELEMENT BASED ON OPERATING PARAMETERS OF A SECOND NETWORK ELEMENT

BACKGROUND OF THE INVENTION

The present invention relates to the field of data and signal communications and communication systems. More particularly, the invention relates to network elements used to facilitate network communication.

A high level of detailed knowledge regarding network devices and protocols is presumed of practitioners in the art. This application presumes familiarity with commonly used network terminology and protocols. For additional background information, the reader is referred to the well-known RFC (Request for Comments) publications of the Internet Engineering Task Force (IETF), as well as the networking standards published by standards bodies such as the IEEE and the International Standards Organization (ISO). This application presumes familiarity with various well-known communications protocols such as ATM (Asynchronous Transfer Mode) and SONET (Synchronous Optical Network). For more information about SONET, the reader is referred to coassigned patent application Ser. No. 09/020,954, filed Feb. 9, 1998, entitled METHOD AND APPARATUS FOR OPERATION, PROTECTION, AND RESTORATION OF HETEROGENEOUS OPTICAL COMMUNICATION NETWORKS, which is incorporated herein by reference for all purposes.

Layered Network Protocols

Modern networks operate according to a layered network protocol suite. One published model for a typical protocol suite is known as the International Standards Organization (ISO) Open Systems Interconnection (OSI) reference model. In the OSI model, networking functions are divided into roughly seven layers, which from the lowest layer to the highest layer may be referred to as: (1) the physical layer, (2) the data link layer, (3) the network layer, (4) the transport layer, (5) the session layer, (6) the presentation layer, and (7) the application layer. In some situations, Layer 1 (the physical layer) includes a number of sublayers. These sublayers may include a second, mostly independent, generally high-speed, network with an independent layered protocol suite. Sublayer communication can include, for example, public data networks provided by telephone companies or by internetwork service providers. One typical example of a sublayer is a high-speed optical network, such as SONET, that can be used to provide distant physical layer links to a subscriber network. Another technology used for sublayer communications is ATM. A sublayer network that provides physical layer connections to network elements in another network is sometimes referred to as a subnetwork.

A set of standard interfaces is implicit between different network protocols operating at different layers. Typically, a particular network element handles traffic primarily at one layer or a subset of layers. For example, layer 3 traffic, consisting of Internet Protocol (IP) packets and other layer 3 packets, is generally handled by NEs referred to as routers, while layer 2 packets (or frames) are generally handled by NEs referred to as bridges. However, in some implementations, the functions of these separate NEs have been blended, such that some NEs may function partially as routers and partially as bridges.

An important concept in a layered network protocol suite is the ideal of layer independence. Layer independence implies that protocols and devices at one layer may operate with a variety of different protocols and devices operating at higher or lower layers without detailed knowledge about operation of those other layers. Generally, each layer is responsible for monitoring traffic and performance at its own layer (when performance is monitored at all) and there is little or no direct communication between layers of performance or configuration information.

Determining Channel Operation Without Examining Channel Data

In some situations it may be disadvantageous for an NE, or group of NEs, to directly monitor its own performance. One such situation arises in optical networks, where it is desirable to route some or all of an optical signal through an NE without examining that signal, as described as a particular embodiment in application Ser. No. 09/020,954. Other such situations might arise in present or future designs of ATM-type or sublayers or other sublayer technology, where faster or cheaper service can be provided at a sublayer, if other NEs can be used by the sublayer to detect transmission problems.

In optical networks, it is known for optical NEs using wave division multiplexing (WDM) to indirectly monitor the performance of a data channel by monitoring the performance of a different wavelength (like the optical supervisory channel) on the same optical cable and from that to infer performance of the data channel. This is an imperfect method for ensuring the accuracy of the data channel itself, however. Another known optical method is for a transmitting optical NE to impress a low frequency signal onto an data signal. The receiving NE can then monitor the low frequency signal to infer the data optical signal quality. This, however, does require some sampling of the data wavelength and also requires additional transmission and detection circuitry for the optical NEs.

It has been proposed to develop new protocols for an NE such as an optical NE to communicate with NEs in other layers to determine the performance of the optical traffic. However, developing such protocols is time consuming and difficult given the large variety of higher layer NEs that may communicate data with the optical layer and a practical means for doing so has not yet been developed.

Another alternative solution is intervention from a human operator with access, either via multiple management stations or an integrated management system, to the status of the different network layers. The operator would then use information from a management station(s) to inform the optical or ATM sublayer NE that there is a problem on a particular connection. However, in many situations, this solution is slow and expensive.

What is needed is a method and apparatus allowing network devices in one group or operating at one layer to configure themselves or be configured in response to traffic conditions determined from a different layer and without intervention from a separate management station. What is further needed is such a method that does not require the development of new protocols for exchanging configuration information between layers. What is further needed is a method and apparatus in an optical network allowing optical NEs to detect and respond to optical channel difficulties without having to directly sample or monitor channel data signals.

SUMMARY OF THE INVENTION

The present invention in one general aspect provides a mechanism for a network element (NE) in a first group of NEs to coordinate its configuration and behavior with an NE in a second group where the first NE is generally not participating in the coordination protocols of the second group. In an embodiment with important advantages, the invention uses existing standard network management protocols and an installed base of management agents in the second group to effect this coordination. In another important aspect, the invention provides a mechanism for an NE or a group of NEs to determine the performance of a communication channel passing through that NE without examining a data signal in that communication channel.

In one embodiment, the invention utilizes an agent associated with an NE and capable of communicating operating parameters. There is a large installed base of such agents, typically in layer 3 network devices (such as routers). These agents are generally intended for communication with network management stations that report network operations to a human user. In prior art systems, existing installed agents are intended to facilitate configuration of the NE in which they are installed or with which they are associated, generally through intervention of a human network manager. According to an embodiment of the invention, a first NE, possibly one operating at a different network layer or a different network or subnetwork, uses the agents to learn about the success or failure of data handled by a second NE and to thereby infer the performance of the first NE. The first NE may then take configuration actions on itself or may use the agent in the second NE to affect the configuration of the second NE. This action may include such things as rerouting data from failed or overloaded communication channels, changing priorities, changing path costs, or establishing backup paths for heavily used communications channels.

One area of particular interest for the invention is in sublayer communications using optical NEs. In such networks, it is desirable for the optical NEs to be able to detect channel defects without examining the optical signal in the channel, and the present invention provides a mechanism for these NEs to detect trouble or failure in optical channels indirectly from other NEs.

The invention will be explained with respect to specific embodiments, but it will be clear to those of skill in the art that the invention may be deployed in many alternative network configurations. The invention may also be deployed for configuration of network devices between different layers than the layers specifically described herein. For the sake of clarity, the invention will be described in terms of specific exemplary networks. It is inherent in the art that networks can be highly variable in the arrangement and configuration of different components. These examples should therefore been taken as illustrations and not seen as limiting the invention. It is also inherent in the art that network systems are illustrated at a particular layer of abstraction, with many devices and details omitted.

DESCRIPTION OF THE SPECIFIC EMBODIMENTS

Figure 1:
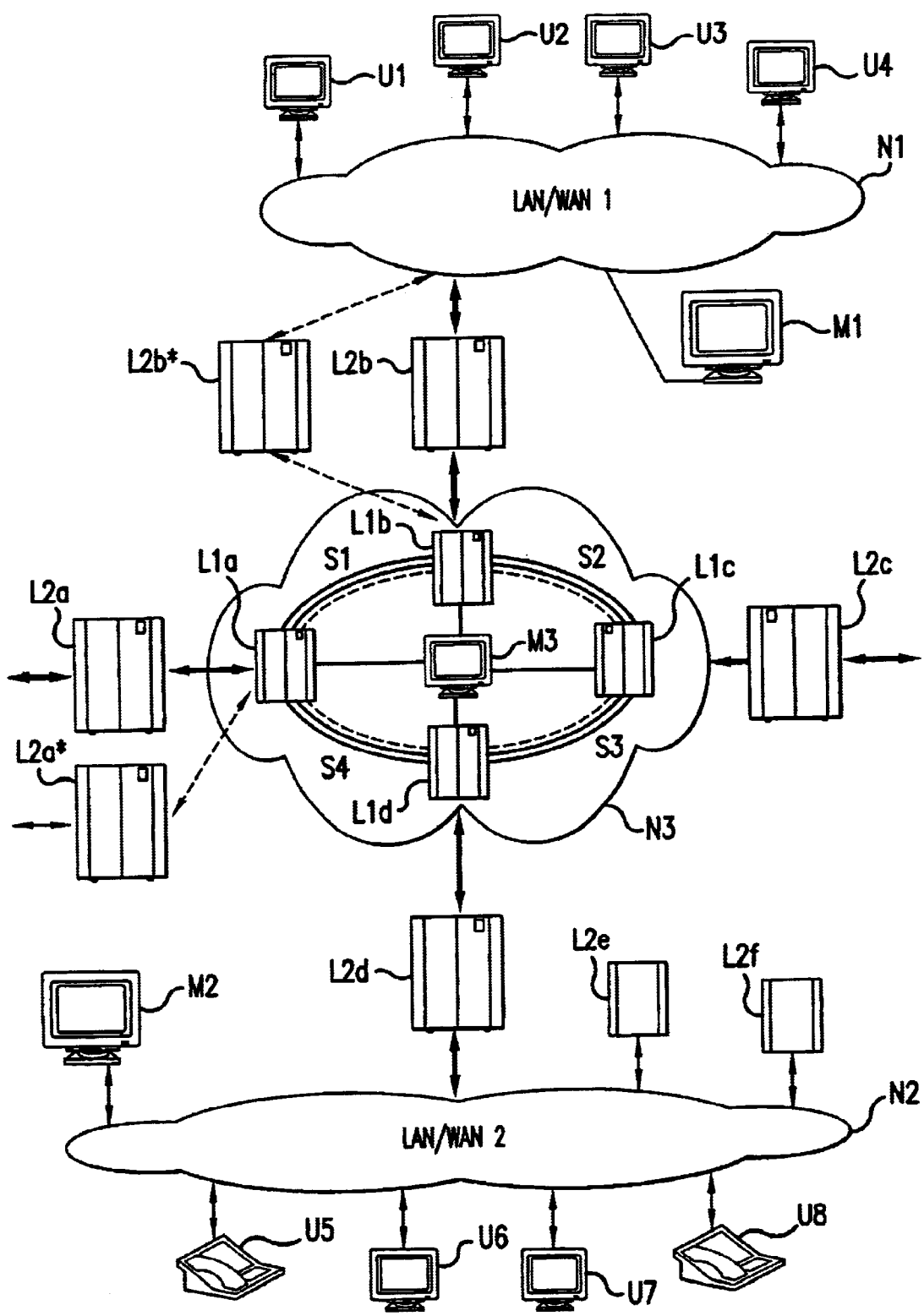
FIG. 1 is a block diagram illustrating exemplary network systems in which the present invention may be employed.

FIG. 1 shows an illustrative example of a simple networking structure. The general diagram of FIG. 1 can represent many different specific network configurations in which the present invention may be employed.

FIG. 1 can be read as comprising three networks, N1, N2, and N3, with N1 connecting end systems U1–4, management station M1, and NE L2b; N2 connecting end systems U5–8, management station M2, and NEs L2d–f; and N3 comprised of NEs L1a–d and providing connection between L2a–d and through those devices connecting N1 and N2.

In a more specific interpretation of FIG. 1, N1 and N2 are local user networks and N3 is an internetwork or a subnetwork for providing communication between local user networks. L2 NEs would therein represent routers or other NEs for connecting local networks to a wider network.

In either interpretation, each of the network clouds labeled N1 and N2 could be understood as configurations of ethernet equipment, fiber optic equipment, radio frequency mesh network equipment, LAN ATM equipment, or combinations of technologies now existing or later developed to provide network communication.

Figure 2A:
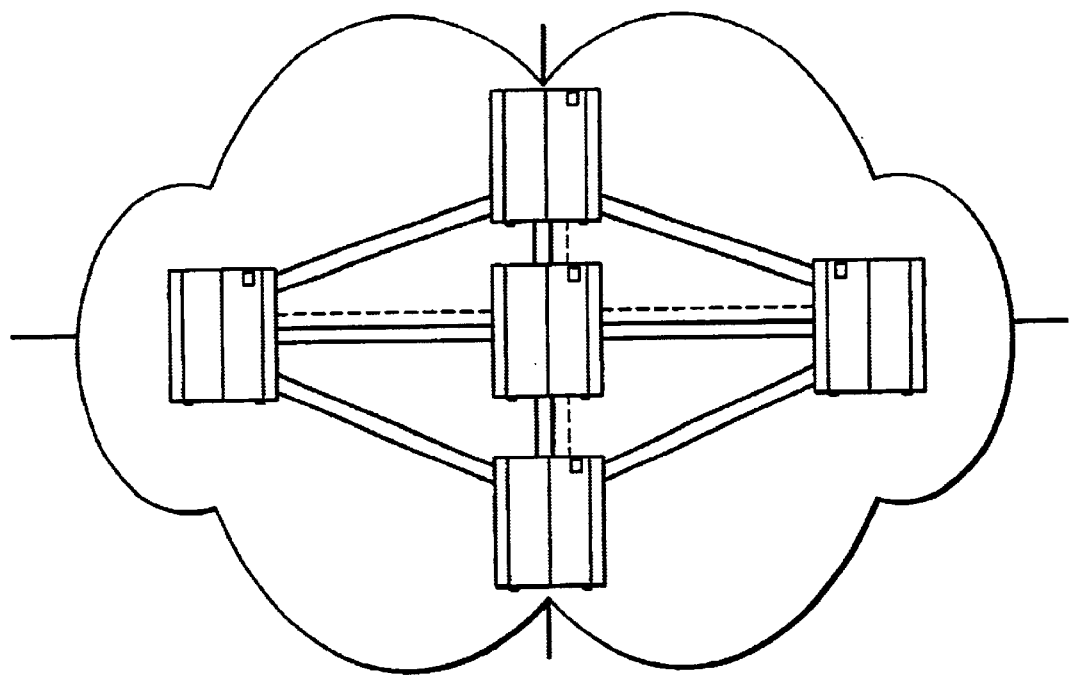
FIG. 2A is a block diagram of a first alternative arrangement of subnetwork NEs.
Figure 2B:
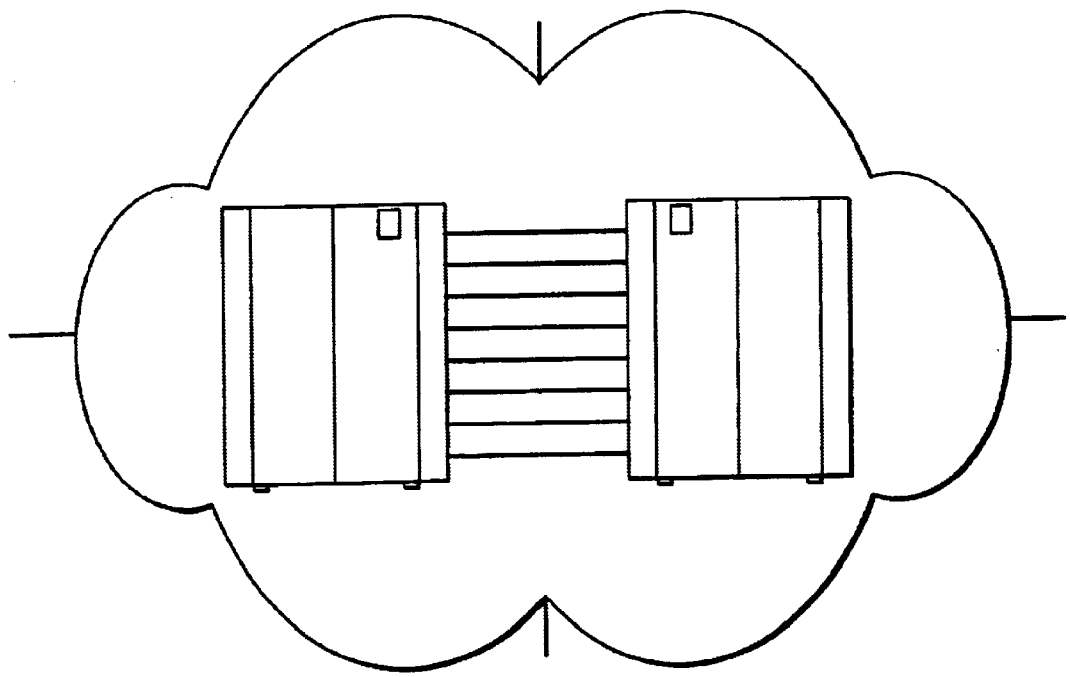
FIG. 2B is a block diagram of a second alternative arrangement of subnetwork NEs.

In a further specific interpretation, N3 represents a subnetwork and the L1 NEs are subnetwork NEs. Commonly used subnetwork technologies include ATM (represented in FIG. 2B), TDM, optical transmission technologies such as SONET. One known optical configuration is represented by the ring configuration shown in FIG. 1 and another known configuration is represented by the mesh configuration shown in FIG. 2A.

In a layered network configuration, it is typical that NEs at a particular layer operate as though they were in direct connections with other NEs at their layer. An L2 NE generally will know out of which out port it should transmit a packet for a specific other L2 NE, and may know some performance characteristics of the a particular channel. An L2 NE generally will not know whether a channel is a direct wire, radio connection, or is provided by some other network. In prior art networks, an L2 NE generally will not communicate directly with any of the NEs in the other network providing the communication channels.

It is further known in the art that L1 NEs, while their operation may be transparent to L2 NE, do generally have an L2 layer network address. This address is not generally used by the L2 NEs, but it may be used by a remote management station to communicate over the network with an L1 NE.

Agents and SNMP

In many networks in use today, some or all of the NEs include agents that monitor and can affect various states of those NEs. These agents communicate with external entities allowing for remote monitoring and management of the NEs with which the agent is associated. Agents are not explicitly shown in the FIG. 1, but they can be understood as logical processes running on some or all of the NEs shown.

One important type of known external entity that communicates with agents is referred to as a management station (MS), such as MS1–3 illustrated as examples in FIG. 1. NE agents communicate internal states of their NE to the MS, generally either in response to queries from the MS or as a result of alarms. An MS station allows a human user (or intelligent management software) to receive information from the agents and then send commands to the NEs. An MS may send commands back to the NE agents that direct the agents to modify certain operation of their NEs or to establish alarms. Known network management stations include SunNet Manager and HP OpenView.

Communication between NE agents and one or more MSs is often performed through a predefined standardized protocol. One well-known protocol for management and monitoring is Simple Network Management Protocol (SNMP), initially defined through the Internet Engineering Task Force. Another management protocol is CMIP, defined by ISO OSI. SNMP has been modified and extended over the years by individual NE vendors and the IETF to incorporate additional functions. According to an early IETF document (RFC 1157), SNMP is described as follows:

"The SNMP Architecture implicit in the SNMP architectural model is a collection of network management stations and NEs. Network management stations execute management applications which monitor and control NEs. NEs are devices such as hosts, gateways, terminal servers, and the like, which have management agents responsible for performing the network management functions requested by the network management stations. The Simple Network Management Protocol (SNMP) is used to communicate management information between the network management stations and the agents in the NEs."

Many vendors of network and computer equipment have developed devices and software that uses SNMP. SNMP defines a get/set protocol for communicating information between NEs and a management station. Sets and gets are transmitted by an MS to an NE. Sets or gets specify variables, referred to as MIBs, which generally relate to some aspect of an NEs operation such as its address, port table, port priorities, errors encountered, etc. MIB variables can be single values or hierarchical arrays of values. Performing a get on a MIB generates a response from the NE that tells the MS something about the NE's operation. A set, where allowed and authorized, can cause a modification in an NE's operation.

SNMP includes some standard MIB definition, but individual vendors can extend SNMP by defining proprietary MIBs. Given the diversity of NE and management station vendors, network management stations are routinely deployed in networks where some of the NEs are built by other vendors. Therefore, many different vendors often must closely coordinate the operational design of their systems in order to have a common set of MIB definitions—a difficult task that can result in delays in bringing new features or products to market.

Correcting Communication Channel Problems

An underlying assumption in many network systems represented by FIG. 1 is that the different groups (or layers) of NEs are responsible within a group for ensuring communications are working properly. A failure in the interconnection somewhere between L1 NEs, for example, is expected to be detected and corrected within that group.

Patent application Ser. No. 09/020,954, describes an NE in which it is desirable for the NE not to examine data signals connected through it. In one embodiment, the present invention allows such an NE to determine if data signals flowing through its are working properly without examining those signals. The NE can then take corrective action, either by configuring itself or by causing other NEs to alter their operation.

According to the invention, an NE such as L1$a$ is enabled to send queries to another NE, such as L2$a$, to determine operating parameters of that other NE. In an advantageous embodiment, these queries are expressed in a preexisting standard management protocol and are made to a standard agent associated with L2$a$. From the point of view of L2$a$, the queries are identical to queries coming from a management station and custom protocol definitions within L2$a$ are not required. Queries between L1$a$ and L2$a$ may be transmitted over a local network connection between the two devices or may be routed through a larger network such as done for other data.

In a particular embodiment, the invention uses SNMP and L1$a$ includes an SNMP query engine (which may include just a subset of SNMP MIB definitions). L1$a$ performs SNMP sets and gets to L2$a$–$e$ or to any other NE with an SNMP agent for which L1$a$ knows the address. L1$a$ can also receive standard format SNMP alarms. L1$a$ includes logic to determine from responses received from other NEs if a performance problem in L1$a$ channels exists. Thereafter, L1$a$ may reconfigure itself and cause reconfiguration of other NEs. The present invention therefore allows a group of NEs to coordinate its operation with another group of NEs using an existing network management protocol. (As used herein and in the claims, the term group should be understood to also encompass a group of one unless the context requires otherwise.) It will be seen that management stations such as M1–3 are not required for operation of the invention, though in one embodiment a management station could be used to respond to some queries or to filter or forward data between L2 agents and the L1 NEs.

As a specific example of the operation of the invention using SNMP definitions, consider the NE L1$a$, enabled to poll the Interfaces Group MIB in L2$a$–$f$. L1$a$ can thereby get standard SNMP fields ifInErrors (which reports the total number of input errors for a particular interface group) and ifInOctets (which reports the total number of input octets received for a particular interface group) for a connection it is concerned about. L1$a$ can compare these values to determine the line error rate, which can then be used to infer the performance of the channel. L1$a$ can then take corrective configuration action if necessary.

L1 and L2 NEs in the preceding discussion are assumed to be in different network groups that are not generally participating in a common routing or bridging protocol. However, it should be understood that an NE generating the set and get requests could be at either a higher layer, a lower layer, or an equal layer to an NE responding to the requests. It should also be understood that requests may be generated by a separate device such as a management station, working cooperatively with an NE; that separate device could then make inferences and take configuration action. Again, however, an MS according to this embodiment of the invention, performs sets and gets on an NE in order to infer the performance and coordinate behavior with a different NE.

In either case, according to various embodiments of the invention, the NEs (or an associated device) that are generating requests are modified to include the capabilities to form the queries, make inference from responses to the queries, and take some configuration action. Responding NEs need only have standard management agent response capabilities.

Determining Performance of an Optical Channel

In one embodiment of the invention, L1$a$ is an optical transport NE with wave-division multiplexing (WDM) such as described in Ser. No. 09/020,954. L1$a$ in this example provides an optical communications channel from L2$a$ to L2$c$ over a particular optical wavelength. According to the invention, L1$a$ is able to infer performance for an optical channel without direct measurement of the optical signal and to take corrective if needed. Corrective action could include rerouting the signal on an alternate optical path. Thus, according to an embodiment of the invention, L1 NEs can use standard MIB definitions and SNMP protocol to determine when to take a proprietary corrective such as routing to an alternate path. In accordance with SNMP, an NE such as L2a or L2b can also be configured for alarms to be sent to L1 devices. Alarms may be set by L1 device, by another entity, or be preset.

In another embodiment, a central management station associated with one or more subnetwork NEs, such as M3, is responsible for collecting operating information from other layer NEs. M3 can then configure the operation of multiple subnetwork NEs in response to information learned from the other network.

Table 1, shown below, is an example of a database according to an exemplary specific embodiment of the invention. This database is kept by L1 NEs, either at an L1 NE or at an L1 management station. Referring back to FIG. 1, in one configuration, the L1 network may establish a connection (C1 in Table 1) between NEs L2a and L2b via span S1 and another connection (C2 in Table 1) between L2b and L2d via spans S2 and S3 with intermediate NE L1c. In an embodiment where the L1 NEs are optical NEs using wave division multiplexing, each connection will further specify one or more wavelengths, λ.

The database allows L1 NEs to examine the path for a connection, and determine which L2 NEs to query in order to infer performance of the optical path. In a specific embodiment, as shown, the database contains L1 box/port and path information along with the L2 NE's IP address, L1 port ID, L2 NE MIB objects to monitor, and alarms for the L1 NEs to request from the L2 NEs. According to this embodiment of the invention, the L1 NEs are provided with a data connection to the other devices for which they provide a communication channel, either a direct channel, or via data forwarding between the L2 NEs, or via data forwarding within the collection of L1 NEs.

As another example of corrective action, an L1 device may use a set to adjust the port priority or path cost recorded in an L2 NE (by using, for example, known MIBs dot1dBridge/dot1dStp/PortTable) to reflect the topology costs at the L1 layer with the intent of modifying the behavior of the routing or bridging algorithm (such as spanning tree) at the L2 layer.

A further advantage in the coordination between L1 NEs and the L2 NEs provided by the invention is that the invention allows L1 subnetwork to provide alternate redundant paths more efficiently by knowing the L2 status. By having information about the error rates seen by the L2 NEs, the L1 layer can proactively prepare backup paths for L2—L2 connections: Further, by discovering that particular L2 NEs are disabled, the L1 layer can reallocate primary or secondary capacity dedicated to those L2 NEs, to backup other L2—L2 connections. These advantages can be realized according to the invention by the L1 implementation group without need for a customized protocol between L1 NEs and L2 NEs or, in one embodiment, without modification to L2 NEs.

Further Applications of the Invention

A further example application for the invention is in the field of uninterruptible power supply (UPS) used to provide short term back up power to an NE in case of a power failure. A UPS generally has a connection (such as an RS232 serial cable) connected to a computer associated with the NE that informs the NE that power has been lost and the UPS is running on batteries. The computer can therefore begin to shut down, if necessary, in a controlled fashion and can alert the NE that power is going down.

According to one embodiment of the invention, a UPS may be provided with an SNMP query engine and a network

TABLE 1

| Con Id | 1st End | MIB objects | Path | 2nd End | MIB objects |
|---|---|---|---|---|---|
| | | Address/Object/MIB_Group/ (MIB_variable, . . .) | \|inPort/NE/outPort\| λ, \|inPort/NE/outPort\| . . . | | Address/Objects/MIB_Group/ (MIB variable, . . .) |
| C1 | L2b | L2b_IP/L2b_Port_λ1/ InterfacesGroup(ifInErrors, ifInOctets) | \|Local1/L1b/S1\| λ1 \|S1/L1a/Local1\| | L2a | L2a_IP/L2a_Port/ InterfacesGroup(ifInErrors, ifInOctets) |
| C2 | L2b | L2b_IP/L2b_Port_λ2/ InterfacesGroup(ifInErrors, ifInOctets) | \|Local1/L1b/S1\| λ2 \|S1/L1c/S2\| λ2 \|S2/L1d/Local1\| | L2d | L2d_IP/L2d_Port_ID_S1/ InterfacesGroup (ifInErrors, ifInOctets) |

In response to an error detected on a particular connection, such as C2, the L1 devices may select an alternate path for some or all of the optical spans that make up connection C2 to create a restoration. One means for providing alternate optical paths is discussed in 09/020,954, incorporated by reference above. This embodiment may be illustrated by FIG. 1 if N3 is interpreted as a subnetwork, the two solid lines between L1 NEs are interpreted as working optical channels, and the dashed lines are interpreted as protection channels. L1kewise, FIG. 2A can be interpreted as an optical mesh network, with only some spans including protection channels.

Figure 3:
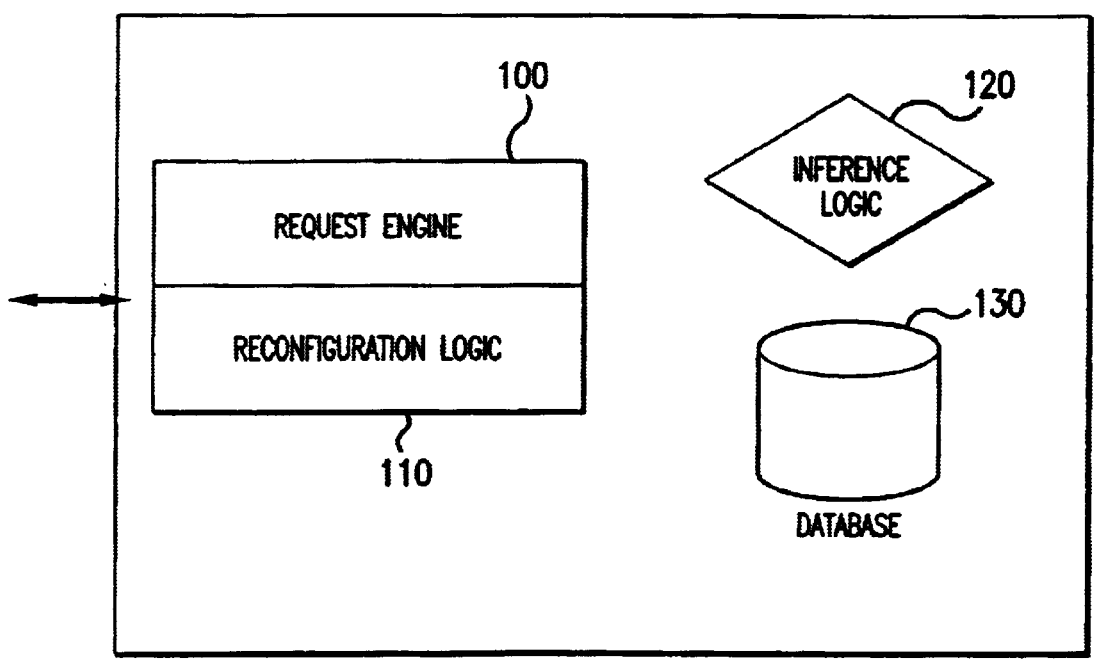
FIG. 3 is a simple block diagram of a device including components according to an embodiment of the invention.

FIG. 3 is a block diagram representing an NE (or MS as described above) with additional components according to the invention to allow it to make requests to other NEs and to take configuration actions based on those requests. Show in the figure is a request engine, 100, reconfiguration logic 110, inference logic 120, and database 130. According to an embodiment of the invention, these elements are incorporated into an NE (or associated device) as elsewhere herein described.

connection and can use that connection to signal its immediate NE that it is going to lose power and can signal other NEs (either at its own layer or at different layers) that an NE is losing power and the other NEs can then reconfigure in response to loss of that NE.

A further example application for the invention is a situation where a determination is made at one layer that a particular link is disabled. For example, IEEE 802. ID bridges employ a spanning tree algorithm that can dynamically determine that some links between bridges should be disabled and will mark those links disabled. In prior art networks, the information that a bridge-layer link has been marked disabled may not become known to a subnetwork layer for some time, or at all. The subnetwork may then continue to reserve capacity for the link, which in fact will not receive any traffic. A query engine in a subnetwork device modified according to an embodiment of the invention could learn directly from a standard layer 2 NE that the link is marked disabled and could reallocate subnetwork resources. Alternatively, as discussed above, the bridge could be modified according to the invention and could inform a standard subnetwork device that the link has been marked disabled.

The invention has now been described with reference to specific embodiments. Other embodiments will be apparent to those of skill in the art. The invention should therefore not be limited in scope except as provided in the attached claims.

What is claimed is:

1. A method for use in communication systems having at least a first and a second group of network elements comprising:
   at a first group network element carrying traffic data on the communication system, sending a request for operating parameters to a second group network element carrying traffic data on the communication system, the request having a network management protocol;
   at said second group network element,
      receiving the request for operating parameters from said first group network element using a management agent of said second group network element designed for communication with a management station, and
      transmitting operating parameters to said first group network element using said management agent of said second group network element designed for communication with said management station;
   at said first group network element, receiving said operating parameters from said management agent of said second group network element;
   at said first group network element, using said operating parameters from said second group network element to infer operation of said first group network element; and
   said first group network element taking configuration action in response to the inferred operation of said first group network element.

2. The method according to claim 1 wherein said operating parameters are transmitted using an SNMP network management protocol.

3. The method according to claim 1 wherein said operating parameters are transmitted using get and set operators performed on variables indicating operating parameters.

4. The method according to claim 1 wherein said first group is part of a sublayer providing sublayer transport services to said second group.

5. The method according to claim 1 wherein said first group is part of an optical communication layer.

6. The method according to claim 1 wherein said first group comprises higher layer network elements than said second group.

7. The method according to claim 1 wherein said second group comprises higher layer network elements than said first group.

8. The method of claim 1 wherein:
   the request for operating parameters is generated by a request engine in said first group network element, said request engine generating queries to said second group network element to infer operation of said first group network element, and for receiving responses from said second group network element, the responses including connection and operation information; and
   the method further compromising:
      storing information regarding the identity of the second group network element and the responses received by the request engine.

9. A first network element in a first network group of a communication system, the first network element comprising:
   means for carrying traffic data on the communication system;
   means for generating a query requesting operating parameters and sending the query to a management agent of a second network element carrying traffic data on the communication system in a second network group;
   means for receiving operating parameters from said management agent of said second group network element;
   means for inferring operation of the first network element based on the operating parameters received from the second network element in the second network group and determining, from said received operating parameters, that a configuration action is desirable; and
   means for implementing said configuration action in response to the inferred operation.

10. A device according to claim 9 wherein said query is defined by an SNMP network management protocol and said agent is an SNMP agent.

11. A device according to claim 9 wherein said operating parameters are transmitted using get and set operators performed on variables indicating operating parameters.

12. A device according to claim 9 wherein said first network element is part of a sublayer providing sublayer transport services to said second network element.

13. A device according to claim 9 wherein said first network element is part of an optical communication layer.

14. A device according to claim 9 wherein said first network element is in a higher layer than said second network element.

15. The first network element of claim 9 wherein:
   said means for generating a query includes a request engine generating queries to said second group network element to infer operation of said first group network element, and for receiving responses from said second group network element, the responses including connection and operation information; and further comprising:
   a database storing information regarding the identity of said second group network element and the responses received by the request engine.

* * * * *